US011912338B2

(12) United States Patent
Tanabe et al.

(10) Patent No.: US 11,912,338 B2
(45) Date of Patent: Feb. 27, 2024

(54) VEHICLE

(71) Applicants: TOYOTA JIDOSHA KABUSHIKI KAISHA, Toyota Aichi-ken (JP); SUBARU CORPORATION, Shibuya-ku Tokyo (JP)

(72) Inventors: Daisuke Tanabe, Nisshin Aichi-ken (JP); Noritaka Kosaka, Shibuya-ku Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 31 days.

(21) Appl. No.: 17/705,550

(22) Filed: Mar. 28, 2022

(65) Prior Publication Data
US 2022/0306208 A1   Sep. 29, 2022

(30) Foreign Application Priority Data

Mar. 29, 2021   (JP) .................................. 2021-055940

(51) Int. Cl.
*B62D 25/02* (2006.01)
*B62D 21/15* (2006.01)
*B62D 25/16* (2006.01)
*B62D 25/20* (2006.01)

(52) U.S. Cl.
CPC ........... *B62D 25/02* (2013.01); *B62D 21/157* (2013.01); *B62D 25/16* (2013.01); *B62D 25/2027* (2013.01); *B62D 25/2036* (2013.01)

(58) Field of Classification Search
CPC ................ B62D 25/02; B62D 25/2036; B62D 25/2027; B62D 21/157
USPC ............ 296/203.01, 203.03, 203.04, 193.05, 296/193.08, 29, 30, 187.12
See application file for complete search history.

(56) References Cited

U.S. PATENT DOCUMENTS

| 5,228,741 A * | 7/1993 | Ide ........................ B62D 21/152 296/187.11 |
| 2014/0191535 A1 | 7/2014 | Sugiyama et al. |
| 2019/0061826 A1 | 2/2019 | Kaneko |
| 2020/0391802 A1 | 12/2020 | Kiyoshita |

FOREIGN PATENT DOCUMENTS

| CN | 109421811 A | 3/2019 | |
| CN | 112092916 A | 12/2020 | |
| EP | 1790552 A2 | 5/2007 | |
| JP | 3148764 B2 * | 1/2001 | ........... B62C 125/02 |
| JP | 2007-145009 A | 6/2007 | |
| JP | 2011-161937 A | 8/2011 | |
| JP | 2014-131889 A | 7/2014 | |

\* cited by examiner

*Primary Examiner* — Dennis H Pedder
(74) *Attorney, Agent, or Firm* — Dinsmore & Shohl LLP

(57) ABSTRACT

A vehicle includes a vehicle body, and a reinforcement member extending along a vehicle cabin-side side portion to vehicle cabin-side peripheral portion of a rear wheel housing of the vehicle body to an opening edge of the vehicle body. The opening edge receives a rear lower portion of a rear door. The reinforcement member includes a projecting portion that defines two or more closed-section spaces respectively extending toward different locations of the opening edge.

7 Claims, 3 Drawing Sheets

VEHICLE

CROSS-REFERENCE TO RELATED APPLICATION

This application claims priority to Japanese Patent Application No. 2021-055940 filed on Mar. 29, 2021, incorporated herein by reference in its entirety.

BACKGROUND

1. Technical Field

A technology disclosed in the specification relates to a vehicle.

2. Description of Related Art

Japanese Unexamined Patent Application Publication No. 2011-161937 (JP 2011-161937 A) describes a wheel housing reinforcement member joined from a vehicle body upper side to a rear cross member fixed to a floor panel at the center of each rear wheel housing of a vehicle. The wheel housing reinforcement member increases the strength of a vehicle body side wall including the wheel housing.

SUMMARY

In recent years, further improvement in the strength of an area around a wheel housing is requested for the purpose of improvement in safety in the event of a side collision. On the other hand, there is also a high request to an area around a rear wheel housing for ensuring sufficient vehicle cabin space. If a large reinforcement member is disposed for the purpose of improvement in strength, the reinforcement member occupies a large space around a wheel housing. A technology disclosed in the specification improves strength while improving space efficiency around a rear wheel housing.

The specification discloses a vehicle. The vehicle includes a vehicle body, and a reinforcement member extending along a vehicle cabin-side side portion to peripheral portion of a rear wheel housing of the vehicle body to an opening edge of the vehicle body. The opening edge receives a rear lower portion of a rear door. The reinforcement member includes a projecting portion that defines two or more closed-section spaces extending toward different locations of the opening edge.

The reinforcement member of the vehicle disclosed in the specification has the two or more closed-section spaces extending from the rear wheel housing toward the different two locations of the opening edge that receives the rear lower portion of the rear door. Therefore, it is possible to reduce the cross-sectional area of each individual closed-section space, so space at the opening edge is efficiently usable. The two or more closed-section spaces of the reinforcement member respectively extend toward the different locations of the door opening edge. Therefore, it is possible to appropriately select locations at the door opening edge, so space at the rear opening edge is efficiently usable.

The reinforcement member is capable of maintaining a function as a reinforcement member by uniformly deforming together with the rear wheel housing in the event of a side collision. Therefore, it is possible to efficiently absorb collision energy and transmit a collision load to another frame member or the like, such as a rear cross member.

Therefore, with the vehicle disclosed in the specification, it is possible to efficiently use space around the rear wheel housing and improve strength.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
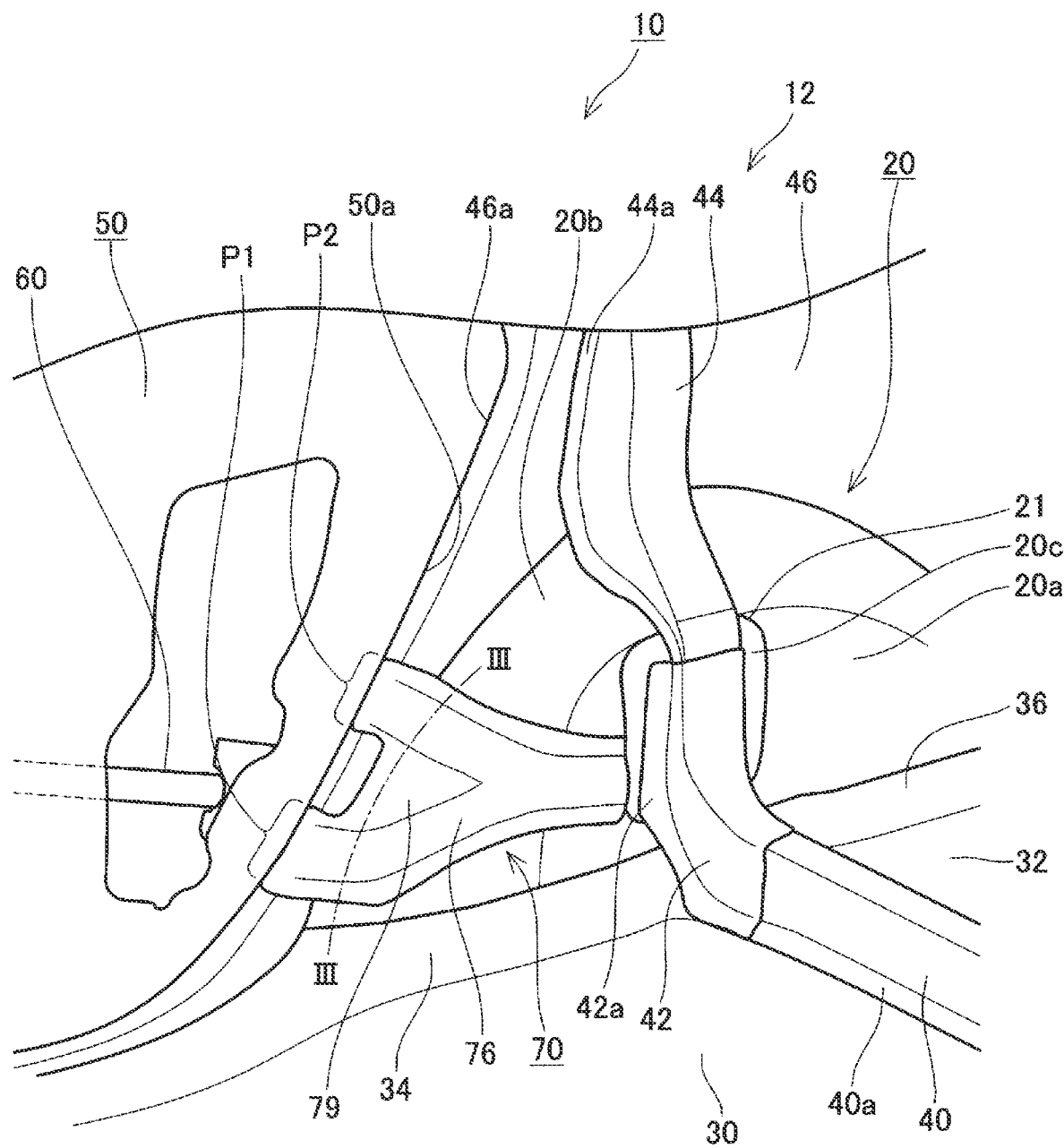
FIG. 1 is a view showing an example of the rear of a vehicle cabin where a reinforcement member is provided.
Figure 1:
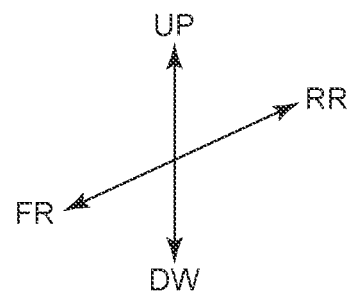

In one embodiment of the technology, the two or more closed-section spaces may be gradually spaced apart from each other toward the opening edge. With this configuration, closed-section spaces respectively extending toward two or more spaced apart locations of the opening edge are easily defined. In addition, the reinforcement member is capable of further uniformly deforming together with the rear wheel housing.

In one embodiment of the technology, the two or more closed-section spaces may have different cross-sectional areas. With this configuration, the flexibility of absorption of collision energy and collision load and the flexibility of ensuring space around the rear wheel housing and at the door opening edge are improved.

In one embodiment of the technology, the two or more closed-section spaces may be defined by two or more continuous projecting portions at the peripheral portion of the rear wheel housing and defined by the two or more separated projecting portions at the opening edge. Since the two or more projecting portions are continuous on the periphery, the strength of the reinforcement member is improved. In addition, since the reinforcement member includes the two or more projecting portions separated at the opening edge, space at the door opening edge is further efficiently usable.

In one embodiment of the technology, the reinforcement member may further include a projecting portion that defines, in the side portion, a closed-section space communicating with the two or more closed-section spaces. With this configuration, strength is also ensured in the side portion, so it is possible to absorb collision energy and transmit a collision load.

In one embodiment of the technology, the reinforcement member may be configured to transmit a load to a rear cross member disposed between a pair of the right and left rear wheel housings. With this configuration, a collision load received by the reinforcement member can be transmitted and distributed to the rear cross member.

In one embodiment of the technology, the reinforcement member may be configured to transmit a load from an impact beam of the rear door. With this configuration, it is possible to effectively absorb side collision energy and transmit a collision load.

Generally, a pair of right and left rear wheel housings is provided. In the embodiment of the technology, at least one of a pair of right and left rear wheel housings just needs to include the reinforcement member.

Hereinafter, a vehicle body rear structure of a vehicle 10, including rear wheel housings, will be described as an embodiment of the technology. The vehicle 10 to be described with reference to the drawings is an electrically-powered vehicle. The vehicle 10 includes rear wheel housings 20 of a vehicle body 12, each of which accommodates a rear wheel (not shown). In the drawing, the direction FR indicates a front side in a front and rear direction of the vehicle body 12, and the direction RR indicates a rear side in the front and rear direction of the vehicle body 12. The direction UP indicates an upside in an up and down direction of the vehicle body 12, and the direction DW indicates a downside in the up and down direction of the vehicle body 12. In the specification, the front and rear direction of the vehicle body 12, the width direction of the vehicle body 12, and the up and down direction of the vehicle body 12 may be respectively simply referred to as front and rear direction, width direction, and up and down direction.

FIG. 1 illustrates a state of a vehicle body structure of a rear of the vehicle body 12 when viewed from a vehicle cabin side. FIG. 1 illustrates a rear wheel housing 20, a rear door 50, a reinforcement member 70, and members around these parts.

As shown in FIG. 1, each of the pair of right and left rear wheel housings 20 is provided behind an opening edge 46a of a quarter panel inner 46. The opening edge 46a receives a door edge 50a at the rear lower portion of the rear door 50. The opening edge 46a is generally referred to as a lock pillar. The lock pillar is generally configured as part of the quarter panel inner 46. The lock pillar may be configured as a member different from the quarter panel inner 46.

Each of the rear wheel housings 20 has a shape swelling toward the vehicle cabin. Each of the rear wheel housings 20 is provided in the vehicle body 12 so as to be joined to a floor side member 34, a rear side member 36, and the like. The rear wheel housing 20 has a side portion 20a and a peripheral portion 20b at the portion swelling toward the vehicle cabin.

An opening 21 is provided at part of the side portion 20a of the rear wheel housing 20. A shock absorber panel 20c is joined so as to back up a predetermined range of the back surface of the side portion 20a including the opening 21. A shock absorber is attached to the shock absorber panel 20c via a shock absorber mounting member (not shown). Part of the shock absorber panel 20c is exposed to the vehicle cabin through the opening 21.

A rear seat panel 30 and a rear floor panel 32 are provided at a vehicle body bottom around the rear wheel housing 20 from the front side of the vehicle body toward the rear side. A rear seat is installed on the rear seat panel 30. A luggage room panel is installed on the rear floor panel 32 to make up the floor surface of a luggage room.

The vehicle body 12 includes the floor side members 34, the rear side members 36, the rear cross member 40, gussets 42, wheel housing upper members (hereinafter, simply referred to as upper members) 44, and the quarter panel inners 46, which make up a rear frame structure. The frame members are, for example, made of a relatively high-strength steel sheet, such as a high-tensile steel sheet.

The floor side member 34 and the rear side member 36 are provided at each of the right and left sides in the vehicle width direction and extend in the front and rear direction of the vehicle body 12. The floor side members 34 and the rear side members 36 support the rear seat panel 30 and the rear floor panel 32.

The rear cross member 40 is provided between the pair of right and left rear wheel housings 20. The rear cross member 40 is a projecting frame member having a substantially U-shape in cross section and raised from the rear seat panel 30 and the rear floor panel 32. The rear cross member 40 has flanges 40a that project continuously in a vehicle body front and rear direction of its opening edge. The rear cross member 40 is joined to the rear seat panel 30 and the rear floor panel 32 by the flanges 40a. When the rear cross member 40 is joined to the floor members, a closed-section space extending in the vehicle width direction is defined between the rear cross member 40 and both the rear seat panel 30 and the rear floor panel 32. Both ends of the rear cross member 40 in the width direction are respectively joined to the pair of right and left gussets 42. As a result, the rear cross member 40 and the gussets 42 function as a load transmission member, for example, in the event of a side collision of the vehicle body 12. The rear cross member 40 and the gussets 42 function as a transmission member for absorption of collision energy and collision load in the event of a rear-end collision.

Each of the gussets 42 is a projecting frame member having a substantially U-shape in cross section and is joined to the rear cross member 40 and the upper member 44. An end of the gusset 42 adjacent to the center in the vehicle body width direction is covered with the end of the rear cross member 40 in the vehicle body width direction. The gusset 42 and the rear cross member 40 are joined to each other.

The gusset 42 is joined to the rear seat panel 30, the rear floor panel 32, the floor side member 34, the rear side member 36, and the side portion 20a by its flanges 42a. At the side portion 20a, the gusset 42 is joined to the shock absorber panel 20c exposed through the opening 21. The gusset 42 is further joined to the upper member 44.

The upper member 44 is a projecting frame member having a substantially U-shape in cross section. A lower end of the upper member 44 is covered with an upper end of the gusset 42. The upper member 44 and the gusset 42 are joined to each other. The upper member 44 is joined to the shock absorber panel 20c, the peripheral portion 20b, and the quarter panel inner 46 by flanges 44a. The upper member 44 defines a closed-section space extending from the vehicle body bottom toward the upper side of the rear wheel housing 20 with the joint surfaces, and contributes to improvement in the stiffness of the rear of the vehicle body 12.

The rear door 50 is attached to a center pillar at the front side of the vehicle body 12 (not shown) so as to be pivotable. A door edge 50a of the rear door 50, extending toward the rear lower-side rear wheel housing 20, is received by the opening edge 46a formed at part of the quarter panel inner 46. The rear door 50 has a closed-section space inside and accommodates an impact beam 60 serving as a member that absorbs collision energy and transmits a collision load in the event of a side collision. The impact beam 60 extends along the front and rear direction of the rear door 50. The rear end of the impact beam 60 is joined to around a point closest to the rear wheel housing 20 on the door edge 50a. Other than the impact beam 60, the rear door 50 further includes, at its vehicle body upper side, another impact beam extending in the vehicle body front and rear direction in the closed-section space of the rear door 50.

The reinforcement member 70 is provided between the gusset 42 and the rear door 50. As shown in FIG. 1, the reinforcement member 70 extends from the side portion 20*a* of the rear wheel housing 20 via the peripheral portion 20*b* to two different points P1, P2 of the opening edge 46*a*. The range from the point P1 to point P2 of the opening edge 46*a* includes a joint area of the impact beam 60 in the door edge 50*a* along the opening edge 46*a*.

The range of each of the points P1, P2 and the distance between the point P1 and the point P2 are determined as needed from the viewpoint of absorbability of collision energy and transmissibility of collision load and from the viewpoint of ensuring vehicle cabin space around the opening edge 46*a*. For example, in FIG. 1, the points P1, P2 are provided so as to avoid an area to which the opening edge 46*a* and the peripheral portion 20*b* of the rear wheel housing 20 are closest and to interpose the area.

The reinforcement member 70 is joined to the side portion 20*a* of the rear wheel housing 20 and the shock absorber panel 20*c* on its back surface side by fastening by a bolt or the like and/or joining by welding or the like. When the reinforcement member 70 is joined to the shock absorber panel 20*c*, the reinforcement member 70 is capable of transmitting a load to the gusset 42 and the rear cross member 40 via the shock absorber panel 20*c*. The reinforcement member 70 is joined to the peripheral portion 20*b* and the opening edge 46*a* of the quarter panel inner 46.

A rear cross member 40 side end portion 72 of the reinforcement member 70 extends along the edge of the opening 21 and also along the flange 42*a* of the gusset 42 on the shock absorber panel 20*c*. An opening edge 46*a* side end portion 74 of the reinforcement member 70 separates at the point P1 and point P2 of the opening edge 46*a* and forms end portions 74*a*, 74*b*.

Figure 2:
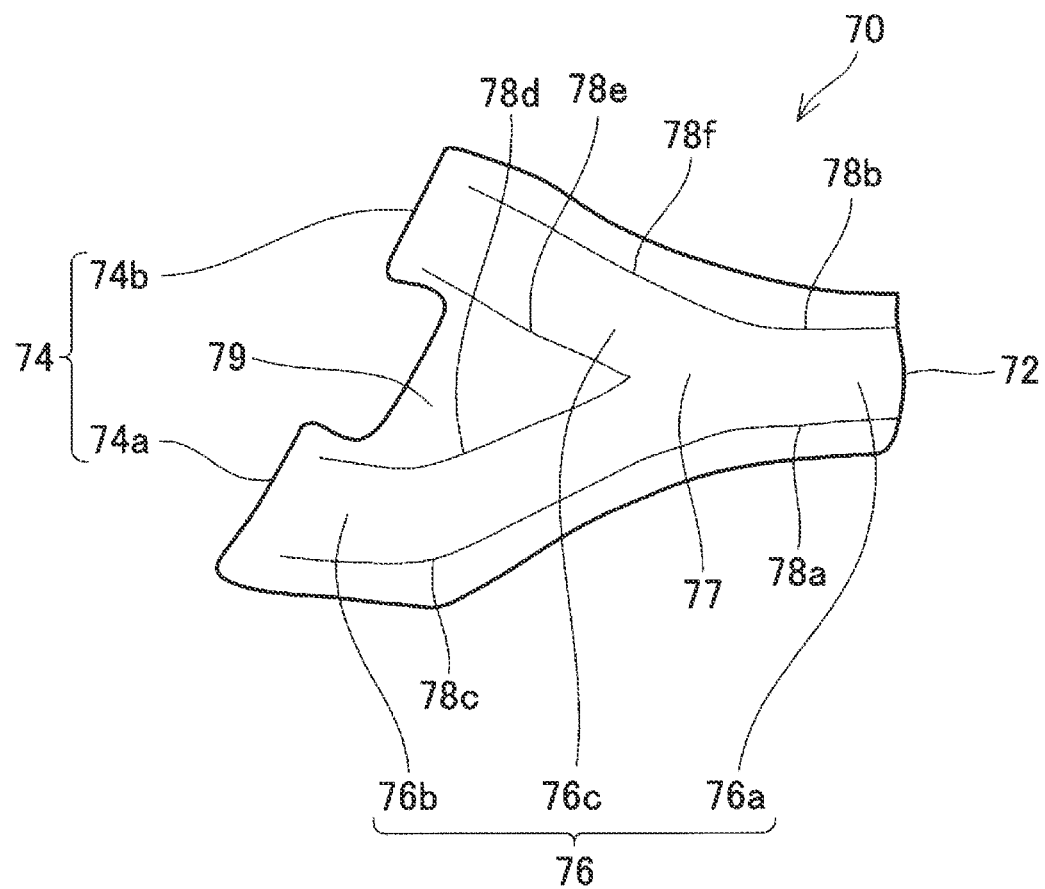
FIG. 2 is an enlarged view of the reinforcement member.

As shown in FIG. 2, the reinforcement member 70 includes a projecting portion 76 extending from the end portion 72 to the opening edge 46*a*. The projecting portion 76 is made up of a projecting portion 76*a* in the side portion 20*a* and two projecting portions 76*b*, 76*c* in the peripheral portion 20*b*.

Figure 3:
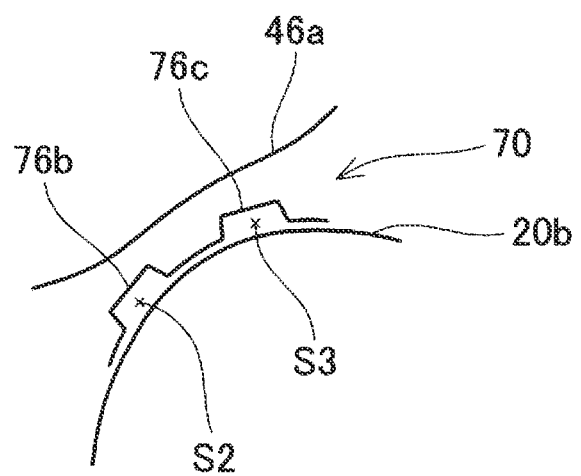
FIG. 3 is a cross-sectional view taken along the line in FIG. 1.

As shown in FIG. 2 and FIG. 3, the projecting portion 76*a* extends to the end portion 72 with an area around the boundary between the side portion 20*a* and the peripheral portion 20*b* as one top portion 77. The projecting portion 76*a* defines a substantially rectangular one closed-section space S1 (not shown) with the side portion 20*a* by ridge lines 78*a*, 78*b* extending from the top portion 77.

The projecting portion 76*b* extends from the top portion 77 to the end portion 74*a*. The projecting portion 76*b* defines a substantially trapezoidal closed-section space S2 extending toward the point P1 with the peripheral portion 20*b* by ridge lines 78*c*, 78*d* extending from the top portion 77. The projecting portion 76*c* extends to the end portion 74*b*. The projecting portion 76*c* defines a substantially trapezoidal closed-section space S3 extending toward the point P2 with the peripheral portion 20*b* by ridge lines 78*e*, 78*f* extending from the top portion 77. The projecting portions 76*b*, 76*c* respectively define the closed-section spaces S2, S3 that gradually separate and bifurcate toward the points P1, P2 of the opening edge 46*a*.

FIG. 3 is a cross-sectional view on the peripheral portion 20*b*, taken along the line III-III in FIG. 1. As shown in FIG. 3, for example, on the peripheral portion 20*b*, the closed-section spaces S2, S3 of the projecting portions 76*b*, 76*c* have substantially the same shape.

Each of the sizes of the projecting portions 76*a*, 76*b*, 76*c* and the closed-section spaces S1, S2, S3 may be the same or may be different over the range in which each portion or space extends. The cross-sectional shape of each of the closed-section spaces S1, S2, S3 appropriate for the shapes of the side portion 20*a* and peripheral portion 20*b* to be joined, a mode of joining, and absorbability of collision energy, transmissibility of collision load, and space-saving capability, to be requested.

As shown in FIG. 2, a substantially triangular base portion 79 is provided between the projecting portions 76*b*, 76*c*. The base portion 79 is a recessed portion having a bottom between the projecting portions 76*b*, 76*c* and is formed continuously from the top portion 77 to before the opening edge 46*a*. The base portion 79 is formed in a substantially triangular shape as a result. With the base portion 79, the projecting portions 76*b*, 76*c* are continuous to before the opening edge 46*a*. In other words, before the opening edge 46*a* and on the peripheral portion 20*b*, the projecting portions 76*b*, 76*c* have two projecting shapes such that sheet-like bodies spaced apart via the base portion 79 are continuously bent. On the other hand, at the opening edge 46*a*, the projecting portions 76*b*, 76*c* have two projecting shapes spaced apart from each other and separated.

Next, the operation and effects of the vehicle 10 having such a vehicle body rear structure will be described. In the vehicle 10, the reinforcement member 70 includes the two projecting portions 76*b*, 76*c* respectively extending along the side portion 20*a* and the peripheral portion 20*b* of the rear wheel housing 20 toward the different two points P1, P2 of the opening edge 46*a*. In other words, the reinforcement member 70 defines the closed-section spaces S2, S3 respectively extending toward the two different points of the opening edge 46*a*. With this configuration, the reinforcement member 70 ensures a bearing force with which collision energy in the event of a side collision is absorbed, and is capable of efficiently absorbing collision energy. As a result, it is possible to transmit a collision load to the gusset 42 and the rear cross member 40 via the shock absorber panel 20*c*, so it is possible to improve the strength around the rear wheel housing 20.

Such an effect is exercised as follows. Since the reinforcement member 70 includes the two separated closed-section spaces S2, S3, the reinforcement member 70 is capable of suppressing peeling of the reinforcement member 70 from the rear wheel housing 20 by suppressing a break of joining points of spot welding or the like. Therefore, with the reinforcement member 70, even when collision energy from the side is absorbed, the reinforcement member 70 is capable of uniformly deforming together with the rear wheel housing 20, so it is possible to maintain the bearing force of the reinforcement member 70 and absorb collision energy.

The reinforcement member 70 is able to implement such efficient absorption of collision energy and transmission of collision load without reducing a vehicle cabin-side space or a space around the opening edge 46*a*. In other words, with the reinforcement member 70, since a bearing force is ensured by the two closed-section spaces S2, S3, the height of each of the projecting portions 76*b*, 76*c* on the side portion 20*a* and peripheral portion 20*b* of the rear wheel housing 20, that is, a raised amount toward a vehicle cabin inner side, is reduced.

With the reinforcement member 70, the closed-section spaces S2, S3 with a reduced raised amount can be defined by selecting appropriate points P1, P2 along the opening edge 46*a* even in, for example, a narrow space between the opening edge 46*a* and the front side of the rear wheel housing 20. Thus, space at the door opening edge is effectively usable. With the reinforcement member 70, even when, for example, an airbag for a side collision and a speed sensor therefor are attached along the opening edge 46a, the reinforcement member 70 can be attached to the opening edge 46a. When the raised amounts of the projecting portions 76b, 76c of the reinforcement member 70 and the points P1, P2 are selected as needed, the reinforcement member 70 can be disposed so as to at least partially overlap an airbag and the like for a side collision.

In the embodiment, the ranges of the points P1, P2 to which the opening edge 46a-side end portions 74a, 74b of the reinforcement member 70 reach include a joint area of the impact beam 60 in the rear door 50. Therefore, the reinforcement member 70 is capable of absorbing collision energy via the impact beam 60 and transmitting a load to the rear cross member 40.

In the embodiment, since the closed-section spaces S2, S3 defined by the projecting portions 76b, 76c are gradually spaced apart toward the opening edge 46a, the closed-section spaces S2, S3 are easily defined at the points P1, P2 spaced apart at the opening edge 46a. Thus, the reinforcement member 70 easily deforms uniformly together with the rear wheel housing 20, and in absorbing and transmitting collision energy from the side.

In the embodiment, since the reinforcement member 70 includes the base portion 79, the projecting portions 76b, 76c have a continuously projecting shape on the peripheral portion 20b up to the opening edge 46a. Thus, the stiffness of the reinforcement member 70 itself is also improved, and the reinforcement member 70 is further capable of deforming uniformly together with the rear wheel housing 20, so absorption of collision energy and transmission of load are efficiently achieved.

Figure 4A:
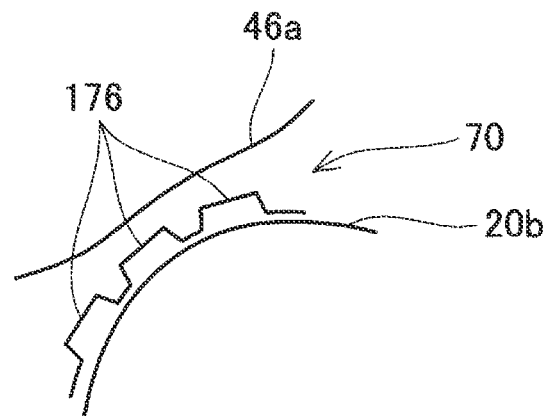
FIG. 4A is other examples of closed-section spaces of a reinforcement member.
Figure 4B:
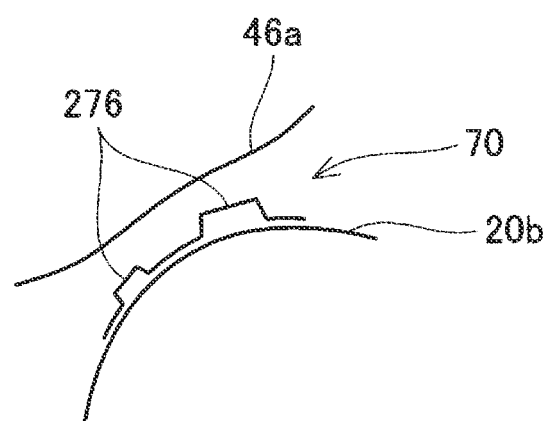
FIG. 4B is other examples of closed-section spaces of a reinforcement member.
Figure 4C:
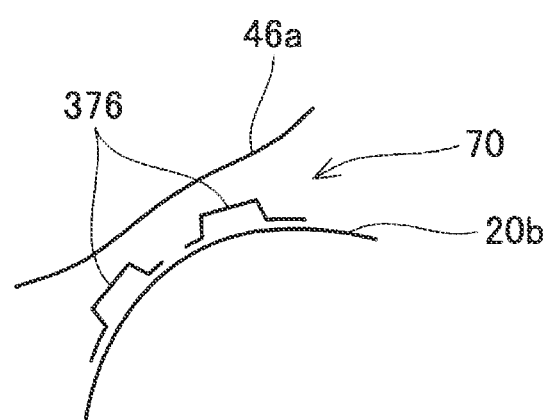
FIG. 4C is other examples of closed-section spaces of a reinforcement member.

In the embodiment, the two projecting portions 76b, 76c of the reinforcement member 70 define substantially the same two closed-section spaces S2, S3; however, the configuration is not limited thereto. The defined closed-section spaces S2, S3 may be changed as needed from the viewpoint of absorption of collision energy and from the viewpoint of space. For example, as shown in FIG. 4A, three or more closed-section spaces may be defined by three or more projecting portions 176. Alternatively, as shown in FIG. 4B, two or more projecting portions 276 may have different cross-sectional areas. Alternatively, as shown in FIG. 4C, two independent closed-section spaces may be provided as discontinuous projecting portions 376 at the opening edge 46a and the peripheral portion 20b of the rear wheel housing 20 by not providing the base portion 79 or reducing the size of the base portion 79.

In the embodiment, the reinforcement member 70 includes the projecting portion 76a that communicates with the bifurcated projecting portions 76b, 76c; however, the configuration is not limited thereto. Where appropriate, on the whole or part of the peripheral portion 20b, a projecting portion may be provided or absorption of collision energy and transmission of load may be performed by ensuring the bearing force of the reinforcement member 70. In the embodiment, the reinforcement member 70 includes the single projecting portion 76a. Alternatively, the reinforcement member 70 may include two or more projecting portions 76a.

Specific examples of the technology disclosed in the specification are described in detail; however, these are only illustrative and are not intended to limit the scope of the appended claims. The technology described in the appended claims also encompasses various modifications and changes from the specific examples illustrated above. The technical elements described in the specification or the drawings exhibit technical usability solely or in various combinations and are not limited to combinations of the appended claims at the time of filing the application. The technology illustrated in the specification and drawings can achieve multiple purposes at the same time and has technical usability by achieving one of those purposes.

What is claimed is:

1. A vehicle comprising:
a vehicle body; and
a reinforcement member extending along a vehicle cabin-side side portion to peripheral portion of a rear wheel housing of the vehicle body to an opening edge of the vehicle body, the opening edge receiving a rear lower portion of a rear door, the reinforcement member including a projecting portion that defines two or more closed-section spaces respectively extending toward different locations of the opening edge.

2. The vehicle according to claim 1, wherein the two or more closed-section spaces are gradually spaced apart from each other toward the opening edge.

3. The vehicle according to claim 1, wherein the two or more closed-section spaces have different cross-sectional areas.

4. The vehicle according to claim 1, wherein the two or more closed-section spaces are defined by two or more continuous projecting portions at the peripheral portion of the rear wheel housing and defined by the two or more separated projecting portions at the opening edge.

5. The vehicle according to claim 1, wherein the reinforcement member further includes a projecting portion that defines, in the side portion, a closed-section space communicating with the two or more closed-section spaces.

6. The vehicle according to claim 1, wherein the reinforcement member is configured to transmit a load to a rear cross member disposed between a pair of the right and left rear wheel housings.

7. The vehicle according to claim 1, wherein the reinforcement member is configured to transmit a load from an impact beam of the rear door.

\* \* \* \* \*